United States Patent
Betensky

[11] 4,094,585
[45] June 13, 1978

[54] LOUPE

[75] Inventor: Ellis I. Betensky, Toronto, Canada

[73] Assignee: Opcon Associates of Canada, Ltd., Toronto, Canada

[21] Appl. No.: 724,323

[22] Filed: Sep. 17, 1976

[51] Int. Cl.$^2$ .................. G02B 9/10; G02B 25/00
[52] U.S. Cl. ................. 350/175 E; 350/189; 350/232
[58] Field of Search ............ 350/189, 232, 175 E, 350/231

[56] References Cited

U.S. PATENT DOCUMENTS

| 2,479,792 | 8/1949 | Tackaberry | 350/231 |
| 3,158,677 | 11/1964 | Lacomme | 350/175 E |

Primary Examiner—Conrad J. Clark
Attorney, Agent, or Firm—DeLio and Montgomery

[57] ABSTRACT

A magnifier or loupe of high magnifying power comprising a positive singlet followed by a cemented doublet in the overall form of a meniscus having bi-convex and bi-concave elements. The cemented surfaces, the outer surfaces of the doublet, or both may be made aspheric.

16 Claims, 2 Drawing Figures

LOUPE

This invention relates to magnifying lenses often referred to as loupes, and more particularly relates to loupes of increased power using only three elements.

With a loupe, the eye is always the pupil independent of its position. For this reason the loupe must be corrected for aberrations of a large aperture, as well as the aberrations of color, astigmatism, and distortion. Additionally, if a loupe is to be used for reading purposes, such as microfilm, then a further requirement of field flatness must be satisfied to avoid excessive reaccommodations and eye fatigue of the user.

Most loupes do not have a flat field. Those that do are complex, having six or more elements.

If the magnifying power is large, on the order of 12x or greater, then a wide angle of view on the order of a 22° semi-field angle is extremely difficult to obtain. Thick or spaced lens elements must be individually achromatized for correction of chromatic aberration. This results in increased axial dimension and further complicates the design.

The present invention provides a loupe of 12x or greater, where magnifying power is defined as two hundred fifty divided by the equivalent focal length. This is achieved by the provision of a positive lens followed by a cemented doublet. Only one negative element is utilized to provide color correction. A loupe embodying the invention is adequately corrected for all aberrations and has a flat field, making it extremely useful as a microfilm reader.

Briefly stated, the invention in one form comprises a first positive group followed by a cemented doublet having the overall shape of a meniscus. Either the cemented surfaces are made aspheric with the outer surfaces spherical or vice versa. However, more aspherics may be added if desired. The positive group preferably comprises a singlet with one aspheric surface, but may be made in the form of a doublet, with or without aspheric surfaces. To achieve the required optical corrections, the surfaces of the lens and certain relationships of surfaces and curvatures are maintained as hereinafter pointed out.

An object of this invention is to provide a loupe of increased magnifying power with only three elements and having good optical correction.

Another object of this invention is to provide a loupe well corrected for field flatness, and having a wide field angle.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

Figure 1:
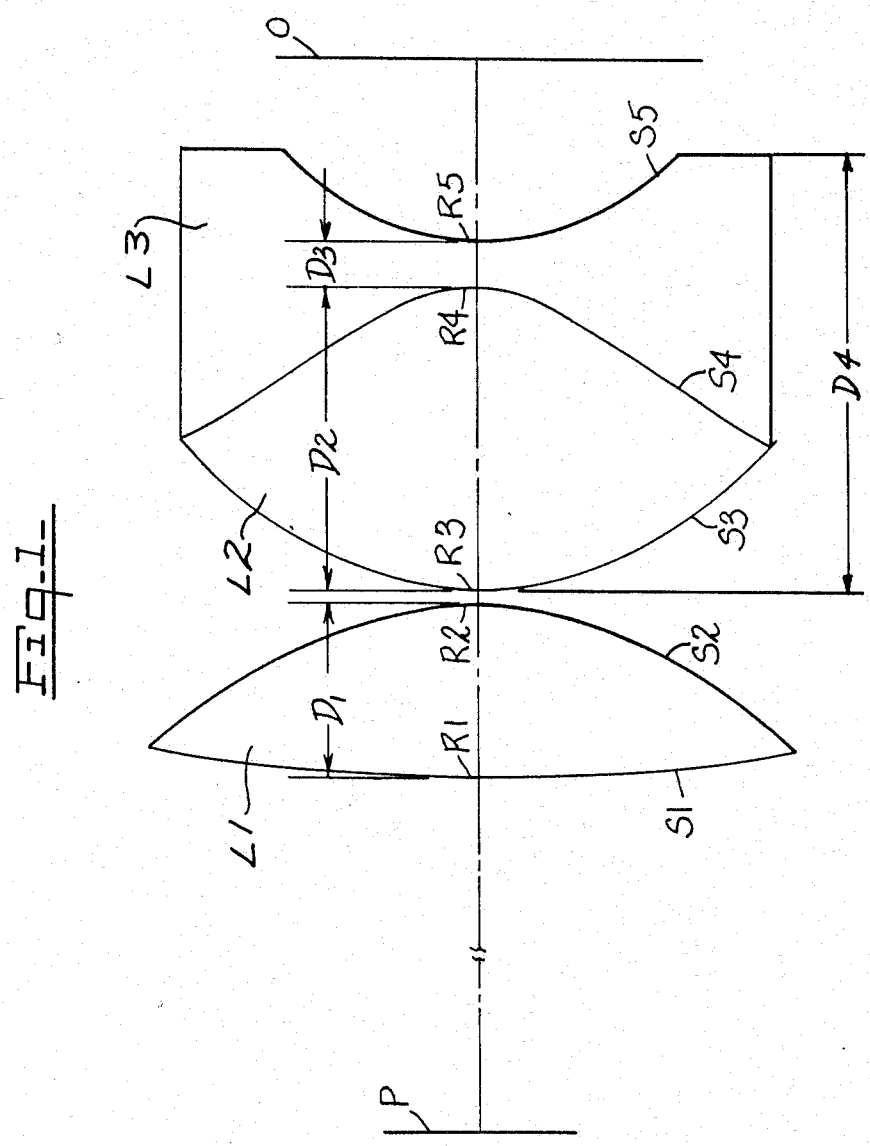
FIG. 1 is a diagrammatic side elevation of a loupe embodying the invention.

In the drawings, the position of the pupil of the eye is shown at P, the object at O, and the optical axis at A.

The loupe comprises a first positive element in the form of a bi-convex element L1, a second bi-convex element L2 and a third bi-concave element L3, having surfaces S1–S5 as indicated. The surfaces S1–S5 are defined on radii R1–R5, at least at the optical axis A. The elements have axial thicknesses D1, D2 and D3.

Where the surfaces are made aspheric, the surfaces are defined by the equation:

$$X - \frac{C}{2}(1+K)X^2 - \frac{CY^2}{2} + G\frac{C^3}{2}Y^4 = 0$$

where

X is the sag in the surface measured from a reference plane perpendicular to the optical axis, Y is the radial ordinate from the optical axis, C is the curvature of a lens surface equal to EFL/R where EFL is the equivalent focal length of the overall lens and R is the radius of the lens surface at the optical axis, K is a conic constant, and G is a higher order coefficient. If the surface is a conic section of rotation, G=0.

Figure 2:
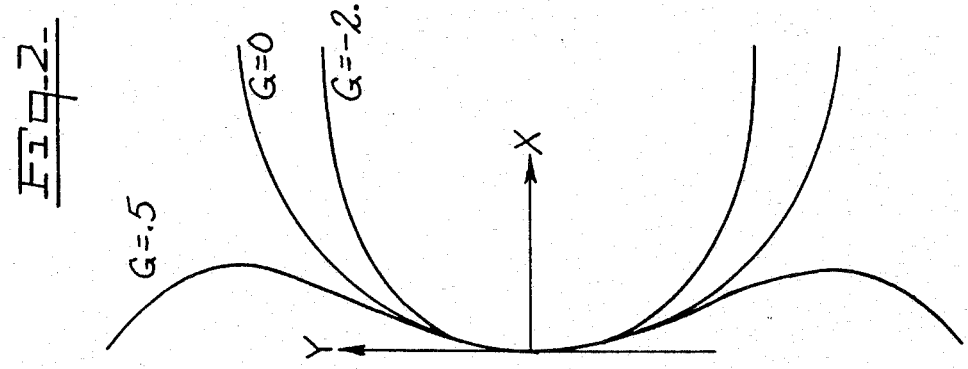
FIG. 2 is a graphical representation of the influence of a higher order term on the lens surface.

FIG. 2 shows the influence of the term $GY^4$. When G=0, the surface will take certain shapes depending on the value of K.

Various values of K will produce surfaces as follows:

| | |
|---|---|
| K = 0 | Spherical |
| K = −1 | Parabolic |
| K = 0 to −1 | Ellipse where smaller axis is vertical |
| K = positive | Ellipse when smaller axis is horizontal |

Generally speaking, if the cemented surface S4 are made aspheric, the outer surfaces of S3 and S5 are spherical and vice versa. However, in Table VII, an example is set forth where all of surfaces S3, S4 and S5 are conics. Either of surfaces S1 or S2 may be made aspheric.

Seven examples of the invention are set forth in Tables I–VII with reference to FIG. 1.

A 14× loupe of 17.8mm EFL with a semi-field angle of 22.0° is set forth in Table I.

TABLE I

| | | Radius of Surfaces S1–S5 | Axial Distance Between Surfaces | $N_d$ | $V_d$ |
|---|---|---|---|---|---|
| P | | | 21.00mm | | |
| L1 | R1 | 28.371mm | 7.077 | 1.491 | 57.1 |
| | R2 | −13.176 | 0.270 | | |
| L2 | R3 | 11.331 | 8.052 | 1.491 | 57.1 |
| | R4 | −14.218 | | | |
| L3 | | | 1.397 | 1.590 | 30.8 |
| BFL | R5 | 6.291 | 6.00 | | |

| Aspheric Surfaces | K | G |
|---|---|---|
| S2 | −1.748 | 0 |
| S3 | .435 | 0 |
| S5 | −.614 | 0 |

| Surface Curvatures | |
|---|---|
| C1 = | .620 |
| C2 = | −1.351 |
| C3 = | 1.571 |
| C4 = | −1.252 |

-continued

| Surface Curvatures | |
|---|---|
| C5 = | 2.829 |

A 14× loupe of 18.0mm EFL with a semi-field angle of 22.0° is set forth in Table II.

TABLE II

| | | Radius of Surfaces S1-S5 | Axial Distance Between Surfaces | $N_d$ | $V_d$ |
|---|---|---|---|---|---|
| P | | | 19.00mm | | |
| L1 | R1 | 74.729mm | 5.683 | 1.491 | 57.1 |
| | R2 | −11.379 | 0.270 | | |
| L2 | R3 | 12.771 | 9.750 | 1.491 | 57.1 |
| | R4 | −4.711 | | | |
| L3 | R5 | 9.390 | 1.397 | 1.590 | 30.8 |
| BFL | | | −5.95 | | |

| Aspheric Surfaces | K | G |
|---|---|---|
| S2 | −.717 | .103 |
| S4 | −2.144 | .038 |

| Surface Curvatures | |
|---|---|
| C1 = | .238 |
| C2 = | −1.564 |
| C3 = | 1.393 |
| C4 = | −3.778 |
| C5 = | 1.895 |

A 14× loupe of 17.8mm EFL with a semi-field angle of 22.0° is set forth in Table III.

TABLE III

| | | Radius of Surfaces S1-S5 | Axial Distance Between Surfaces | $N_d$ | $V_d$ |
|---|---|---|---|---|---|
| P | | | 19.00mm | | |
| L1 | R1 | 54.801mm | 5.708 | 1.491 | 57.1 |
| | R2 | −12.117 | 0.270 | | |
| L2 | R3 | 12.697 | 10.129 | 1.491 | 57.1 |
| | R4 | −4.457 | | | |
| L3 | R5 | 8.951 | 1.397 | 1.590 | 30.8 |
| BFL | | | 5.48 | | |

| Aspheric Surfaces | K | G |
|---|---|---|
| S2 | −.771 | .101 |
| S4 | −2.109 | −.025 |

| Surface Curvatures | |
|---|---|
| C1 = | .324 |
| C2 = | −1.467 |
| C3 = | 1.400 |
| C4 = | −4.098 |
| C5 = | 2.005 |

A 14× loupe of 17.8mm EFL with a semi-field angle of 22.0° is set forth in Table IV.

TABLE IV

| | | Radius of Surfaces of S1-S5 | Axial Distance Between Surfaces | $N_d$ | $V_d$ |
|---|---|---|---|---|---|
| P | | | 21.00mm | | |
| L1 | R1 | 30.014mm | 6.857 | 1.491 | 57.1 |
| | R2 | −14.049 | 0.270 | | |
| L2 | R3 | 14.055 | 10.828 | 1.491 | 57.1 |
| | R4 | − 4.577 | | | |
| L3 | R5 | 8.958 | 1.397 | 1.590 | 30.8 |
| BFL | | | 4.67 | | |

| Aspheric Surfaces | K | G |
|---|---|---|
| S2 | −1.362 | 0 |
| S4 | −1.584 | 0 |

| Surface Curvatures | |
|---|---|
| C1 = | .592 |
| C2 = | −1.267 |
| C3 = | 1.266 |
| C4 = | −3.889 |
| C5 = | 1.987 |

A 13× loupe of 20.0mm EFL with a semi-field angle of 19.5° is set forth in Table V.

TABLE V

| | | Radius of Surface S1-S5 | Axial Distance Between Surfaces | $N_d$ | $V_d$ |
|---|---|---|---|---|---|
| P | | | 21.00mm | | |
| L1 | R1 | 28.080mm | 6.256 | 1.490 | 57.1 |
| | R2 | −13.772 | .274 | | |
| L2 | R3 | 11.084 | 6.967 | 1.490 | 57.1 |
| | R4 | −14.946 | | | |
| L3 | R5 | 6.422 | 1.397 | 1.589 | 30.8 |
| BFL | | | 8.21 | | |

| Aspheric Surfaces | K | G |
|---|---|---|
| S2 | −1.759 | 0 |
| S3 | −0.605 | 0 |
| S5 | −0.805 | 0 |

| Surface Curvatures | |
|---|---|
| C1 = | .712 |
| C2 = | −1.452 |
| C3 = | 1.804 |
| C4 = | −1.338 |
| C5 = | 3.115 |

A 14× loupe of 17.8mm EFL with a semi-field angle of 22.0° is set forth in Table VI.

TABLE VI

| | | Radius of Surfaces S1-S5 | Axial Distance Between Surfaces | $N_d$ | $V_d$ |
|---|---|---|---|---|---|
| P | | | 19.00mm | | |
| L1 | R1 | 84.545mm | 5.621 | 1.491 | 57.1 |
| | R2 | −11.187 | 0.270 | | |
| | R3 | 12.822 | | | |

TABLE VI-continued

| | Radius of Surfaces S1-S5 | Axial Distance Between Surfaces | $N_d$ | $V_d$ |
|---|---|---|---|---|
| L2 | | 9.212 | 1.491 | 57.1 |
| | R4 −5.421 | | | |
| L3 | | 1.397 | 1.590 | 30.8 |
| | R5 10.052 | | | |
| BFL | | 6.537 | | |

| Aspheric Surfaces | K | G |
|---|---|---|
| S2 | −.735 | .102 |
| S4 | −2.203 | −.069 |

| Surface Curvatures | | |
|---|---|---|
| C1 | = | .210 |
| C2 | = | −1.600 |
| C3 | = | 1.390 |
| C4 | = | −3.420 |
| C5 | = | 1.770 |

A 14× loupe of 17.8mm EFL with a semi-field angle of 22.0° is set forth in Table VII.

TABLE VII

| | Radius of Surfaces S1-S5 | Axial Distance Between Surfaces | $N_d$ | $V_d$ |
|---|---|---|---|---|
| P | | 21.00mm | | |
| L1 | R1 29.341 | 6.924 | 1.491 | 57.1 |
| | R2 −13.877 | 0.270 | | |
| L2 | R3 14.118 | 10.639 | 1.491 | 57.1 |
| | R4 −4.576 | | | |
| L3 | R5 8.903 | 1.397 | 1.590 | 30.8 |
| BFL | | 4.74 | | |

| Aspheric Surfaces | K | G |
|---|---|---|
| S2 | −1.470 | 0 |
| S3 | .070 | 0 |
| S4 | −1.618 | 0 |
| S5 | .015 | 0 |

| Surface Curvatures | | |
|---|---|---|
| C1 | = | .606 |
| C2 | = | −1.283 |
| C3 | = | 1.261 |
| C4 | = | −3.891 |
| C5 | = | 2.000 |

In the foregoing tables, L1, L2, L3 are the lens elements, R1-R5 are the radii of the surfaces S1-S5 at the optical axis, $N_d$ is the index of refraction, $V_d$ is the abbe number, P is the pupil position, BFL is the back focal length, and C1-C5 are the curvatures of the surfaces at the optical axis where C = EFL/R. Radii defined from a point to the right are considered positive.

In Tables I and IV, the outer surfaces of the doublet are made aspheric while the cemented surfaces are spherical. In Table VII, the cemented surfaces are also aspheric. In Tables II, III, IV and VI, the cemented surfaces are aspheric, and in II and VI are modified by the term GY4. The surface S2 of element L1 is shown as a conic or modified conic in all examples but may be spherical, or L1 can be divided into two elements if desired.

The elements may be made of any suitable optically clear plastic such as polymethyl methacrylate, polycyclohexyl methacrylate, polystyrene, or acrylonitrile.

Certain relationships of the elements may be noted from the foregoing tables.

The curvatures C2 and C3 of surfaces S2 and S3, respectively, differ by no more than .25 and reside within the range $$1.0 < S_{2,3} < 2.0$$

The ratio of the axial thickness D2 and D3 of L2 to L3 is $$4.8 < D2/D3 < 8.0$$

Such ratio multiplied by the thickness D1 of element L1 is $$60 > D2/D3 \cdot D1 > 25$$

The surface curvatures are $$0.2 < C1 < 0.75$$
$$1.0 < C2 < 1.7$$
$$1.2 < C3 < 1.9$$
$$1.0 < C4 < 5.0$$
$$1.5 < C5 < 3.5$$

where S4 is not aspheric $$|C4| < C3$$
$$|C4| < C5$$

Where S4 is aspheric $$|C4| > C3$$
$$|C4| > C5$$

The axial thickness D4 of the doublet bears the following relation to D1, the axial thickness of the positive singlet $$2 > D4/D3 > 1$$

The first singlet element primarily provides high power for magnifying purposes, while the doublet primarily provides color correction and provides a flat field, as well as correcting other aberrations.

To maintain color correction for presently available optical plastics which have Abbe values in a range of 30 to 58, the sum of the absolute value of the curvatures of surfaces S3, S4 and S5 should be in the range of 5.0 to 8.0 or otherwise stated $$8.0 < |C3| + |C4| + |C5| > 5.0$$

The elements may be mounted in a housing (not shown) so as to have axial motion for focusing, and means may be provided on such housing or attachable thereto to carry microfilm, microfiche or other items for viewing.

The lenses of Tables I-VII also may be defined by the surface curvatures with the axial distance between surfaces of the tables set forth as a function of the EFL of the lens.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A magnifier comprising from the viewing end, a first positive lens group comprising a singlet element, a second lens group comprising a bi-convex element and a bi-concave element forming a doublet having the overall shape of a meniscus, said elements having surfaces S1–S5 with curvatures C1–C5 numbered successively from the viewing end where the curvature is the equivalent focal length of the lens, divided by the surface radius at the optical axis, and $$0.2 < C1 < 0.75$$

$$1.0 < C2 < 1.7$$

$$1.2 < C3 < 1.9$$

$$1.0 < C4 < 5.0$$

$$1.5 < C5 < 3.5.$$

2. The magnifier of claim 1 wherein said first element has first and second surfaces S1 and S2, said second group has surfaces S3, S4 and S5, all surfaces numbered from the viewing end, and one of surface S4, and surfaces S3 and S5 are aspheric.

3. The magnifier of claim 2, where surface S2 is aspheric.

4. The magnifier of claim 2 where surface S4 is aspheric.

5. The magnifier of claim 2 where surfaces S3 and S5 are aspheric.

6. The magnifier of claim 2 where surfaces S3 and S5 are aspheric, and where $$C3 > |C4|$$

$$C5 > |C4|.$$

7. The magnifier of claim 1 wherein said surfaces S1–S5 have curvatures C1–C5 respectively at the optical axis where C is the equivalent focal length of the overall lens divided by the surface radius of each surface at the optical axis where surface S4 is aspheric, and where $$|C4| > C3$$

$$|C4| > C5.$$

8. The magnifier of claim 2 where the sum of the absolute value of the curvatures of said surfaces S3, S4 and S5 respectively is between five and eight.

9. The magnifier of claim 1 wherein said first group has subtending surfaces S1 and S2, said second lens group has surfaces S3, S4 and S5 and the sum of the absolute values of the curvatures of surfaces S3, S4 and S5 respectively is between five and eight.

10. The lens of claim 1 defined substantially as follows:

|    | Surface Curvatures | Axial Distance Between Surfaces/BFL | $N_d$ | $V_d$ |
|----|---|---|---|---|
| L1 | S1 .620 | | | |
|    | | .398 | 1.491 | 57.1 |
|    | S2 −1.351 | | | |
|    | | .015 | | |
| L2 | S3 1.571 | | | |
|    | | .452 | 1.491 | 57.1 |
|    | S4 −1.252 | | | |
| L3 | | .078 | 1.590 | 30.8 |
|    | S5 2.829 | | | |

| Aspheric Surfaces | K | G |
|---|---|---|
| S2 | −1.748 | 0 |
| S3 | − .435 | 0 |
| S5 | − .614 | 0 | where EFL is the equivalent focal length of the lens; L1–L3 are successive elements with L1 closest to the viewer, S1–S5 are successive surface curvatures of elements L1–L3 at the optical axis where the curvature is the EFL of the lens divided by radius of the surface at the optical axis; and aspheric surfaces are defined by the equation:

$$X - \tfrac{1}{2}C(K+1)X^2 - \tfrac{1}{2}CY^2 + G(C^3/2)Y^4 = 0$$

where $X$ is the sag of the surface along an abscissa on the optical axis at the radial distance $Y$ from the optical axis; $C$ is the curvature of the surface; $K$ is a conic constant and $G$ is a higher order coefficient of aspheric sag of the surface; $N_d$ is the index of refraction and $V_d$ is the Abbe number of the elements.

11. The lens of claim 1 defined substantially as follows:

|    | Surface Curvatures | Axial Distance Between Surfaces/BFL | $N_d$ | $V_d$ |
|----|---|---|---|---|
| L1 | S1 .238 | | | |
|    | | .316 | 1.491 | 57.1 |
|    | S2 −1.564 | | | |
|    | | .015 | | |
| L2 | S3 1.393 | | | |
|    | | .542 | 1.491 | 57.1 |
|    | S4 −3.778 | | | |
| L3 | | .078 | 1.590 | 30.8 |
|    | S5 1.895 | | | |

| Aspheric Surfaces | K | G |
|---|---|---|
| S2 | − .717 | .103 |
| S4 | −2.144 | .038 | where EFL is the equivalent focal length of the lens; L1–L3 are successive elements with L1 closest to the viewer, S1–S5 are successive surface curvatures of elements L1–L3 at the optical axis where the curvature is the EFL of the lens divided by radius of the surface at the optical axis; and aspheric surfaces are defined by the equation:

$$X - \tfrac{1}{2}C(K+1)X^2 - \tfrac{1}{2}CY^2 + G(C^3/2)Y^4 = 0$$

where $X$ is the sag of the surface along an abscissa on the optical axis at the radial distance $Y$ from the optical axis; $C$ is the curvature of the surface; $K$ is a conic constant and $G$ is a higher order coefficient of aspheric sag of the surface; $N_d$ is the index of refraction and $V_d$ is the Abbe number of the elements.

12. The lens of claim 1 defined substantially as follows:

|    | Surface Curvatures | Axial Distance Between Surfaces/BFL | $N_d$ | $V_d$ |
|----|---|---|---|---|
| L1 S1 | .324 | | | |
|    S2 | −1.467 | .321 | 1.491 | 57.1 |
| L2 S3 | 1.400 | .015 | | |
|    S4 | −4.098 | .569 | 1.491 | 57.1 |
| L3 S5 | 2.005 | .078 | 1.590 | 30.8 |

| Aspheric Surfaces | K | G |
|---|---|---|
| S2 | −.771 | .101 |
| S4 | −2.109 | −.025 | where EFL is the equivalent focal length of the lens; L1-L3 are successive elements with L1 closest to the viewer, S1-S5 are successive surface curvatures of elements L1-L3 at the optical axis where the curvature is the EFL of the lens divided by radius of the surface at the optical axis; and aspheric surfaces are defined by the equation:

$$X - \tfrac{1}{2}C(K+1)X^2 - \tfrac{1}{2}CY^2 + G(C^3/2)Y^4 = 0$$

where $X$ is the sag of the surface along an abscissa on the optical axis at the radial distance $Y$ from the optical axis; $C$ is the curvature of the surface; $K$ is a conic constant and $G$ is a higher order coefficient of aspheric sag of the surface; $N_d$ is the index of refraction and $V_d$ is the Abbe number of the elements.

13. The lens of claim 1 defined substantially as follows:

|    | Surface Curvatures | Axial Distance Between Surfaces/BFL | $N_d$ | $V_d$ |
|----|---|---|---|---|
| L1 S1 | .592 | | | |
|    S2 | −1.267 | .403 | 1.491 | 57.1 |
| L2 S3 | 1.266 | .015 | | |
|    S4 | −3.889 | .608 | 1.491 | 57.1 |
| L3 S5 | 1.987 | .078 | 1.590 | 30.8 |

| Aspheric Surfaces | K | G |
|---|---|---|
| S2 | −1.362 | 0 |
| S4 | −1.584 | 0 | where EFL is the equivalent focal length of the lens; L1-L3 are successive elements with L1 closest to the viewer, S1-S5 are successive surface curvatures of elements L1-L3 at the optical axis where the curvature is the EFL of the lens divided by radius of the surface at the optical axis; and aspheric surfaces are defined by the equation:

$$X - \tfrac{1}{2}C(K+1)X^2 - \tfrac{1}{2}CY^2 + G(C^3/2)Y^4 = 0$$

where $X$ is the sag of the surface along an abscissa on the optical axis at the radial distance $Y$ from the optical axis; $C$ is the curvature of the surface; $K$ is a conic constant and $G$ is a higher order coefficient of aspheric sag of the surface; $N_d$ is the index of refraction and $V_d$ is the Abbe number of the elements.

14. The lens of claim 1 defined substantially as follows:

|    | Surface Curvatures | Axial Distance Between Surfaces/BFL | $N_d$ | $V_d$ |
|----|---|---|---|---|
| L1 S1 | .712 | | | |
|    S2 | −1.452 | .313 | 1.490 | 57.1 |
| L2 S3 | 1.804 | .014 | | |
|    S4 | −1.338 | .348 | 1.490 | 57.1 |
| L3 S5 | 3.115 | .070 | 1.589 | 30.8 |

| Aspheric Surfaces | K | G |
|---|---|---|
| S2 | −1.759 | 0 |
| S3 | −0.605 | 0 |
| S5 | −0.805 | 0 | where EFL is the equivalent focal length of the lens; L1-L3 are successive elements with L1 closest to the viewer, S1-S5 are successive surface curvatures of elements L1-L3 at the optical axis where the curvature is the EFL of the lens divided by radius of the surface at the optical axis; and aspheric surfaces are defined by the equation:

$$X - \tfrac{1}{2}C(K+1)X^2 - \tfrac{1}{2}CY^2 + G(C^3/2)Y^4 = 0$$

where $X$ is the sag of the surface along an abscissa on the optical axis at the radial distance $Y$ from the optical axis; $C$ is the curvature of the surface; $K$ is a conic constant and $G$ is a higher order coefficient of aspheric sag of the surface; $N_d$ is the index of refraction and $V_d$ is the Abbe number of the elements.

15. The lens of claim 1 defined substantially as follows:

|    | Surface Curvatures | Axial Distance Between Surfaces/BFL | $N_d$ | $V_d$ |
|----|---|---|---|---|
| L1 S1 | .210 | | | |
|    S2 | −1.600 | .316 | 1.491 | 57.1 |
| L2 S3 | 1.390 | .015 | | |
|    S4 | −3.420 | .518 | 1.491 | 57.1 |
| L3 S5 | 1.770 | .078 | 1.590 | 30.8 |

| Aspheric Surfaces | K | G |
|---|---|---|
| S2 | −.735 | .102 |
| S4 | −2.203 | −.069 | where EFL is the equivalent focal length of the lens; L1-L3 are successive elements with L1 closest to the viewer, S1-S5 are successive surface curvatures of elements L1-L3 at the optical axis where the curvature is the EFL of the lens divided by radius of the surface at the optical axis; and aspheric surfaces are defined by the equation:

$$X - \tfrac{1}{2}C(K+1)X^2 - \tfrac{1}{2}CY^2 + G(C^3/2)Y^4 = 0$$

where $X$ is the sag of the surface along an abscissa on the optical axis at the radial distance $Y$ from the optical axis; $C$ is the curvature of the surface; $K$ is a conic constant and $G$ is a higher order coefficient of aspheric sag of the surface; $N_d$ is the index of refraction and $V_d$ is the Abbe number of the elements.

16. The lens of claim 1 defined substantially as follows:

|  | Surface Curvatures | Axial Distance Between surfaces/BFL | $N_d$ | $V_d$ |
|---|---|---|---|---|
| S1 | .606 | | | |
| L1 | | .389 | 1.491 | 57.1 |
| S2 | −1.283 | | | |
| | | .015 | | |
| S3 | 1.261 | | | |
| L2 | | .598 | 1.491 | 57.1 |
| S4 | −3.891 | | | |
| L3 | | .078 | 1.590 | 30.8 |
| S5 | 2.000 | | | |

| Aspheric Surfaces | K | G |
|---|---|---|
| S2 | −1.470 | 0 |
| S3 | .070 | 0 |
| S4 | −1.618 | 0 |
| S5 | .015 | 0 | where EFL is the equivalent focal length of the lens; L1–L3 are successive elements with L1 closest to the viewer, S1–S5 are successive surface curvatures of elements L1–L3 at the optical axis where the curvature is the EFL of the lens divided by radius of the surface at the optical axis; and aspheric surfaces are defined by the equation:

$$X - \tfrac{1}{2}C(K+1)X^2 - \tfrac{1}{2}CY^2 + G(C^3/2)Y^4 = 0$$

where $X$ is the sag of the surface along an abscissa on the optical axis at the radial distance $Y$ from the optical axis; $C$ is the curvature of the surface; $K$ is a conic constant and $G$ is a higher order coefficient of aspheric sag of the surface; $N_d$ is the index of refraction and $V_d$ is the Abbe number of the elements.

* * * * *

UNITED STATES PATENT AND TRADEMARK OFFICE
CERTIFICATE OF CORRECTION

PATENT NO. : 4,094,585
DATED : June 13, 1978
INVENTOR(S) : Ellis I. Betensky

It is certified that error appears in the above-identified patent and that said Letters Patent are hereby corrected as shown below:

Column 2, line 33, "surface" should read --surfaces--.

Column 2, line 60, ".435" should read -- -.435--.

Column 4, Table V, in the heading, "Surface S1-S5" should read --Surfaces S1-S5--.

In claims 10 - 16, in the heading, "Axial Distance Between Surfaces/BFL" should read --Axial Distance Between Surfaces/EFL--

Signed and Sealed this

Nineteenth Day of December 1978

[SEAL]

Attest:

RUTH C. MASON
Attesting Officer

DONALD W. BANNER
Commissioner of Patents and Trademarks